United States Patent Office 3,379,507
Patented Apr. 23, 1968

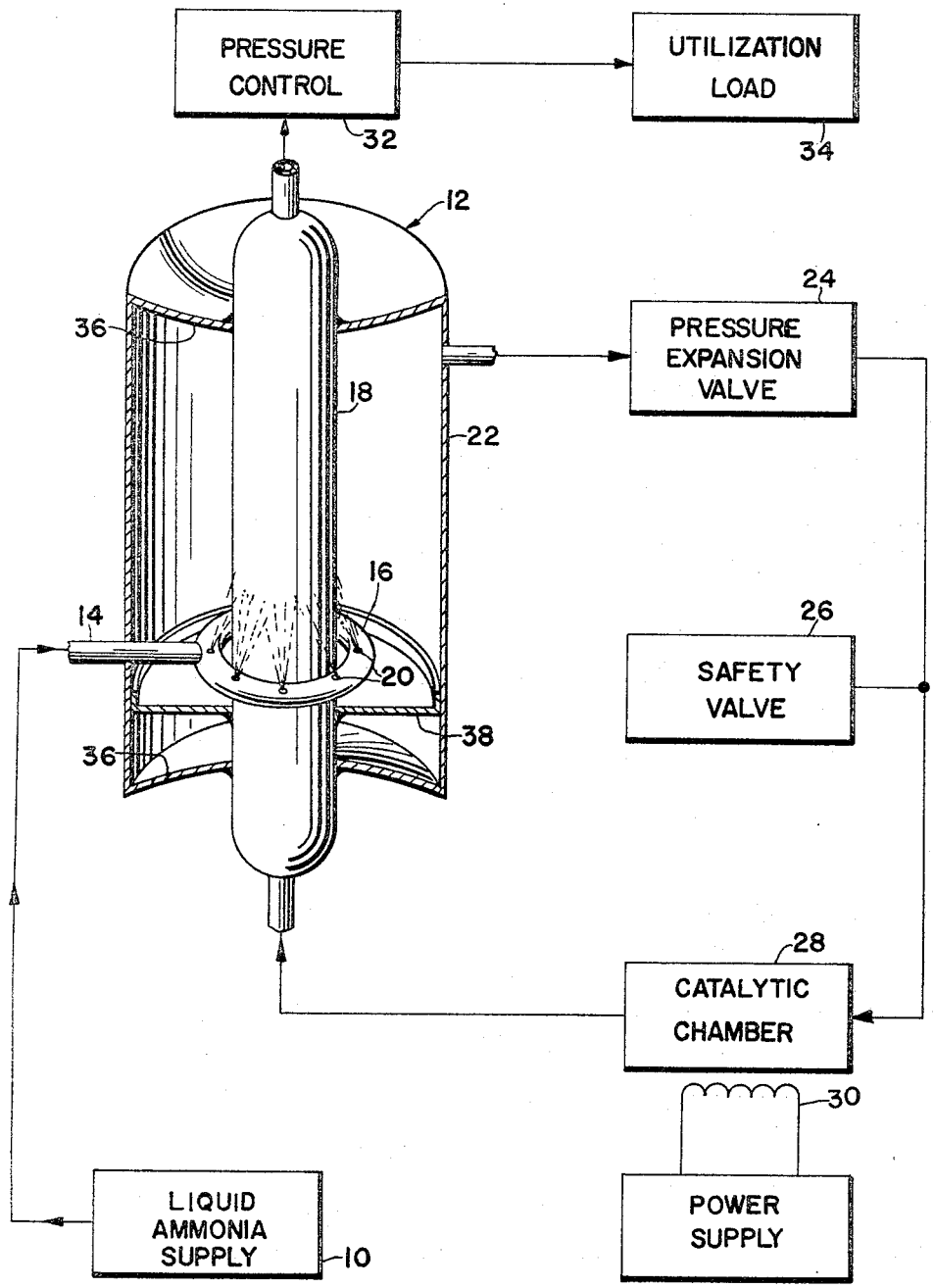

3,379,507
AMMONIA VAPORIZER AND
DISSOCIATOR SYSTEM
Patrick O. Becker, San Jose, Calif., and Homer M. Robey, Junction City, Oreg., assignors to Varian Associates, Palo Alto, Calif., a corporation of California
Filed Apr. 1, 1964, Ser. No. 356,433
2 Claims. (Cl. 23—288)

ABSTRACT OF THE DISCLOSURE

In an ammonia dissociator, bell shaped or convex ends on the heat exchanger which operates under extreme temperature differentials of from 60–100° F. to 900–1000° F. have been found to eliminate most, if not all, premature structural failures caused by thermal shock. The shape of the ends causes the internal forces to work a compression rather than an expansion of the metal. Further, increased efficiency of vaporization is obtained by diffusing the liquid ammonia against a centrally disposed heating tube by means of an apertured ring surrounding the tube with holes inclined 87° from the horizontal. The elimination of thermal shock damage and efficiency is further enhanced by locating a drip pan below the diffuser ring which catches any residual cold liquid ammonia and vaporizes it.

This invention relates to apparatus for producing controlled atmospheres, and in particular to an improved anhydrous ammonia vaporizer.

Dissociated ammonia, which consists generally of about 75% hydrogen and 25% nitrogen, is used to provide suitable atmospheres for various purposes, such as brazing, annealing, sintering and welding metals. In order to obtain "cracked" or dissociated ammonia, raw liquid ammonia is vaporized and passed over a heated catalyst, such as nickel. However, in prior known ammonia vaporizes, the difference in temperature between the liquid ammonia provided to the system and the heated gas or vapor processed by the system is very great. The input liquid ammonia may be at −34° Fahrenheit at ambient pressure, or between 60–100° F. when under 120 pounds of pressure, by way of example. In contrast, the heated gas or vapor reaches 900–1000° F. This large temperature difference between the liquid and gas in the same system induces thermal stress and shock at critical points and areas of the apparatus, causing deformation, breaking or bursting, especially along seams or welds. As a result, the system has to be shut down frequently, parts repaired or replaced, making maintenance and operation time-consuming, and expensive.

An object of this invention is to provide an improved ammonia vaporizer apparatus.

In the apparatus of this invention, liquid ammonia is injected into the housing of a heat exchanger and vaporized into gaseous ammonia by means of a heat flow element. The gaseous ammonia is then directed to a catalytic chamber or retort where it is purified, super heated and "cracked" to form gaseous dissociated ammonia. The super heated dissociated gas is channeled from the catalytic chamber to the heat flow element, which may be a tube disposed within the heat exchanger housing, and then to a utilization load for further use.

In accordance with this invention, a cylindrical heat exchanger housing is closed by bell shaped or convex inwardly ends so internal forces work to compress the metal instead of expand it thereby providing a reinforced structure which resists tension and stress developed by thermal effects. A tubular diffuser ring is coupled to the liquid ammonia input supply and encompasses the heat flow element or tube disposed within the housing. The diffuser has apertures formed at an angle inclined towards the heat flow tube to deflect the incoming cold liquid to the relatively hot tube, whereby the vaporization process is accelerated. Also, a baffle in the form of a container or drip pan is positioned below the diffuser ring to catch any liquid that is not vaporized, and to prevent the contact of cold liquid with points or areas of the housing that are heated.

The invention will be described in greater detail with reference to the sole figure of the drawing, which is a sectional view and block diagram of the inventive apparatus.

With reference to the drawing, a liquid ammonia supply 10 provides raw liquid ammonia under a pressure of about 120 pounds and at a temperature between 60–100° F. to a cylindrical heat exchanger 12 through a supply inlet 14 coupled to an annular diffuser tube 16. The diffuser 16 encircles a heat flow tube 18 which is maintained at about 950° F., and directs a stream of liquid ammonia to the heat flow tube by means of a series of apertures 20 formed therein. The walls of the apertures 20 are inclined towards the centrally disposed heat tube 18 such that the pressurized liquid ammonia is directed towards the surface of the tube. Upon contact of the cold liquid ammonia with the heat tube 18, the liquid ammonia is vaporized into a gas. The gaseous ammonia then flows out of the heat exchanger housing 22 through a pressure expansion valve 24 which reduces the high pressure of the gas to about 15 pounds. A safety valve device 26 is coupled across the expansion valve output line to prevent excessive pressures from being built up in the system.

The gas is then directed to a catalytic chamber or retort 28, which contains a nickel catalyst. A heating apparatus 30 that is external to the chamber 28, heats the chamber to a temperature of about 1700–2000° F., whereby the ammonia gas is superheated and a "cracking" or dissociation of the ammonia into its components of hydrogen and nitrogen takes place. The "cracked" or dissociated gas is then fed back at a temperature of about 950° F. and a pressure of about 10–12 pounds to the flow tube 18 located within the heat exchanger housing 22. The superheated gas in the flow tube serves to provide continuous vaporization of the liquid ammonia supplied to the heat exchanger 12. The dissociated ammonia is then passed through pressure control valve 32 to a utilization load 34 for further use, such as bright brazing of copper or silver.

In accordance with one feature of this invention, the heat exchanger housing 22 is fabricated with bell shaped or convex inwardly ends 36. Such a curved end structure strengthens the housing 22 by effecting compression of ends 36 due to the internal forces and affords resistance to tension and stress developed by thermal effects, thus minimizing bending, cracking and breakage of sensitive sections of the housing. Those areas particularly susceptible to fracture and breakage are the junctions or seams formed by weld spots between the tube 18 and the ends 36 through which the tube projects.

Furthermore, to reduce the probability of the occurrence of thermal differentials that appear when cold liquid ammonia contacts heated portions of the heat exchanger assembly, a baffle or drip pan 38 is positioned adjacent to and below the diffuser ring 16 whereby any liquid ammonia that is not flash vaporized by contact with the tube 18 is deposited in the pan. The pan 38 is thermally conducting and is heated by contact with the heat flow tube 18, so that any liquid ammonia deposited in the pan is also vaporized. In this manner, the efficiency of the total vaporization process is improved, while precluding the possibility of having cold liquid ammonia make contact with heated wall portions of the heat exchanger housing 22.

In a typical installation constructed in accordance with this invention, the heat exchanger housing was formed from ½" mild steel Shelby tubing and the diffuser ring was made from ½" Shelby tubing with No. 45 drill holes drilled at an angle of 87° from the horizontal. With such construction, a virtual total elimination of cracking and fracturing has been realized, most notably at the joined sections between the heat flow tube and end portions of the housing. The performance and durability of the inventive apparatus present a sharp contrast with prior known equipments, which required frequent repairs. Repair of prior known vaporizers that experiences fracture and distortion necessitated lengthy shut-down intervals at considerable cost.

It is understood that this invention is not limited merely to ammonia vaporizers, but may be applied to any structures used to produce controlled atmospheres. Also, the materials, pressures, temperatures, structural shapes and the like are presented only by way of example, and may be varied or modified, within the scope of the inventive concept. In addition, several heat exchanger tubes were employed in previous equipments to provide sufficient surface area for vaporization of the cold liquid; whereas the inventive structure utilizes a single centrally disposed heated cylindrical tube which has been found to be sufficient to effect highly efficient operation. In essence, the inventive combination provides a novel structure and mode of operation for the type of apparatus wherein large temperature differentials exist between the several parts of a heat exchanging system utilized for producing controlled atmospheres.

What is claimed is:

1. In ammonia dissociating apparatus having a liquid ammonia vaporizer coupled to an externally heated catalytic chamber for dissociating ammonia, an improved liquid ammonia vaporizer comprising: means for providing liquid ammonia under pressure; a housing for receiving said ammonia, said housing being closed by convex inwardly ends; a heating tube disposed within said housing and passing through said convex ends for vaporizing the liquid ammonia; an apertured tubular ring adjacent said heating tube for diffusing the liquid ammonia against said heating tube; means coupled to said housing for passing the vapor to said heated catalytic chamber for dissociation; input means coupled to said heating tube for receiving the dissociated vapor for transmission through and heating of said heating tube.

2. An ammonia vaporizer according to claim 1 further including a drip pan disposed below said ring for vaporizing liquid ammonia.

References Cited

UNITED STATES PATENTS

| | | | |
|---|---|---|---|
| 1,746,209 | 2/1930 | Alexander. | |
| 1,915,120 | 6/1933 | Burke | 23—288 |
| 2,264,693 | 12/1941 | Gier | 23—288 |
| 2,892,262 | 6/1959 | Shirk | 23—288 X |
| 3,025,145 | 3/1962 | Terpenning | 23—288 |
| 3,088,812 | 5/1963 | Bitterlich et al. | 23—281 |
| 3,235,344 | 2/1966 | Dreyer et al. | 23—288 X |
| 3,272,259 | 9/1966 | Shields | 165—158 |

JOSEPH SCOVRONEK, *Primary Examiner.*